(12) United States Patent
Bialer

(10) Patent No.: US 10,444,348 B2
(45) Date of Patent: Oct. 15, 2019

(54) SEPARATION OF CLOSE TARGETS BASED ON DOPPLER PRECODING

(71) Applicant: GM Global Technology Operations LLC, Detroit, MI (US)

(72) Inventor: Oded Bialer, Petah Tivak (IL)

(73) Assignee: GM GLOBAL TECHNOLOGY OPERATIONS, Detroit, MI (US)

( * ) Notice: Subject to any disclaimer, the term of this patent is extended or adjusted under 35 U.S.C. 154(b) by 252 days.

(21) Appl. No.: 15/679,572

(22) Filed: Aug. 17, 2017

(65) Prior Publication Data
US 2019/0056490 A1    Feb. 21, 2019

(51) Int. Cl.
| G01S 13/93 | (2006.01) |
| G01S 13/18 | (2006.01) |
| G01S 13/50 | (2006.01) |
| G01S 13/94 | (2006.01) |

(52) U.S. Cl.
CPC ............ *G01S 13/931* (2013.01); *G01S 13/18* (2013.01); *G01S 13/50* (2013.01); *G01S 13/94* (2013.01); *G01S 2013/9375* (2013.01)

(58) Field of Classification Search
None
See application file for complete search history.

(56) References Cited

U.S. PATENT DOCUMENTS

| 3,149,329 A * | 9/1964 | Prestwood | F42C 13/04 342/119 |
| 3,201,791 A * | 8/1965 | Roland | G01S 13/505 273/371 |
| 3,480,953 A * | 11/1969 | Shreve | G01S 13/528 342/163 |
| 3,550,126 A * | 12/1970 | Gellekink | G01S 13/4445 342/160 |
| 3,786,509 A * | 1/1974 | Applebaum | G01S 13/5265 342/159 |
| 3,975,734 A * | 8/1976 | Payne | G01S 13/9011 342/25 B |
| 4,121,209 A * | 10/1978 | ap Rhys | G01S 13/5242 342/157 |
| 4,616,228 A * | 10/1986 | Giaccari | G01S 7/2921 342/160 |
| 4,714,927 A * | 12/1987 | Siegel | G01S 13/225 342/160 |
| 5,463,399 A * | 10/1995 | Kretschmer, Jr. | G01S 13/288 342/132 |
| 5,530,448 A * | 6/1996 | Lewis | G01S 13/282 342/132 |
| 5,870,054 A * | 2/1999 | Lewis | G01S 13/282 342/163 |
| 6,400,306 B1 * | 6/2002 | Nohara | G01S 13/5244 342/160 |

* cited by examiner

*Primary Examiner* — Shelley Chen
(74) *Attorney, Agent, or Firm* — Cantor Colburn LLP

(57) ABSTRACT

A system and method to separate close targets includes transmitting a pulse sequence and detecting a first target at a first target Doppler frequency based on processed received reflections resulting from the pulse sequence. A nulling pulse sequence designed to null the processed received reflections at the target Doppler frequency is transmitted.

20 Claims, 3 Drawing Sheets

SEPARATION OF CLOSE TARGETS BASED ON DOPPLER PRECODING

INTRODUCTION

The subject disclosure relates to the separation of close targets based on Doppler precoding.

Vehicles (e.g., automobiles, trucks, construction equipment, farm equipment, automated factory equipment) are increasingly outfitted with sensor systems that facilitate enhanced or automated vehicle operation. A radar system is a sensor system that transmits sequences of pulses and receives pulses that are reflected back by a target. When the target is in motion, the received pulses resulting from incremental transmitted pulses exhibit a phase change. This phase change corresponds with a frequency change referred to as the Doppler frequency. The Doppler frequency associated with targets of different velocities will be different such that the targets may be distinguished from each other. However, when the bandwidth of the filter used to capture the different Doppler frequencies is limited due to limited integration time based on the changing target positions, targets with high reflectivity may mask targets with lower reflectivity that are close in position and speed. Accordingly, it is desirable to provide separation of close targets based on Doppler precoding.

SUMMARY

In one exemplary embodiment, a method of separating close targets includes transmitting a pulse sequence and detecting a first target at a first target Doppler frequency based on processed received reflections resulting from the pulse sequence. The method also includes transmitting a nulling pulse sequence designed to null the processed received reflections at the target Doppler frequency.

In addition to one or more of the features described herein, a second target having a lower reflectivity than the target is detected based on the processed received reflections resulting from the nulling pulse sequence.

In addition to one or more of the features described herein, the pulse sequence is generated to have a constant phase.

In addition to one or more of the features described herein, the detecting the first target includes forming a matrix of received sequences $a(f_i)$ for Doppler frequencies $f_i$ of $f_0$ through $f_L$ given by:

$$A=[a(f_0)a(f_1) \ldots a(f_L)].$$

In addition to one or more of the features described herein, wherein the detecting the first target includes determining each of the received sequences $a(f_i)$ for sampling time intervals $T_0$ through $T_L$ as:

$$a(f_i)=[e^{j2\pi f_i T_0} e^{j2\pi f_i T_1} \ldots e^{j2\pi f_i T_L}]^T, \text{where}$$

T indicates a transpose to a column vector.

In addition to one or more of the features described herein, the nulling pulse sequence is generated by generating a binary vector b of length L+1.

In addition to one or more of the features described herein, the generating the binary vector b includes setting every element of the binary vector b to 1 except the element corresponding with the target Doppler frequency of the first target.

In addition to one or more of the features described herein, the generating the nulling pulse sequence is according to:

$$w=\arg \min_{\tilde{w}}\|A\tilde{w}-b\|^2, \text{where}$$

w is the null pulse sequence.

In addition to one or more of the features described herein, the nulling pulse sequence is solved as:

$$w=(A^H A)^{-1} A^H b, \text{where}$$

H represents a Hermitian transpose.

In addition to one or more of the features described herein, the pulse sequence is transmitted again following the transmitting the nulling pulse sequence.

In another exemplary embodiment, a system to separate close targets includes a radar system to transmit a pulse sequence. The system also includes a controller to detect a first target at a first target Doppler frequency based on processed received reflections resulting from the pulse sequence and to generate a nulling pulse sequence designed to null the processed received reflections at the target Doppler frequency.

In addition to one or more of the features described herein, the controller detects a second target having a lower reflectivity than the target based on the processed received reflections resulting from the nulling pulse sequence.

In addition to one or more of the features described herein, the controller is further configured to generate the pulse sequence to have a constant phase.

In addition to one or more of the features described herein, the controller is further configured to detect the first target based on forming a matrix of received sequences $a(f_i)$ for Doppler frequencies $f_i$ of $f_0$ through $f_L$ given by:

$$A=[a(f_0)a(f_1) \ldots a(f_L)].$$

In addition to one or more of the features described herein, the controller is further configured to detect the first target based on determining each of the received sequences $a(f_i)$ for sampling time intervals $T_o$ through $T_L$ as:

$$a(f_i)=[e^{j2\pi f_i T_0} e^{j2\pi f_i T_1} \ldots e^{j2\pi f_i T_L}]^T, \text{where}$$

T indicates a transpose to a column vector.

In addition to one or more of the features described herein, the controller is further configured to generate the nulling pulse sequence based on generating a binary vector b of length L+1.

In addition to one or more of the features described herein, the controller is further configured to generate the binary vector b based on setting every element of the binary vector b to 1 except the element corresponding with the target Doppler frequency of the first target.

In addition to one or more of the features described herein, the controller is further configured to generate the nulling pulse sequence according to:

$$w=\arg \min_{\tilde{w}}\|A\tilde{w}-b\|^2, \text{where}$$

w is the null pulse sequence.

In addition to one or more of the features described herein, the controller is further configured to solve for the nulling pulse sequence as:

$$w=(A^H A)^{-1} A^H b, \text{where}$$

H represents a Hermitian transpose.

In addition to one or more of the features described herein, the radar system is further configured to transmit the pulse sequence again following transmitting the nulling pulse sequence.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
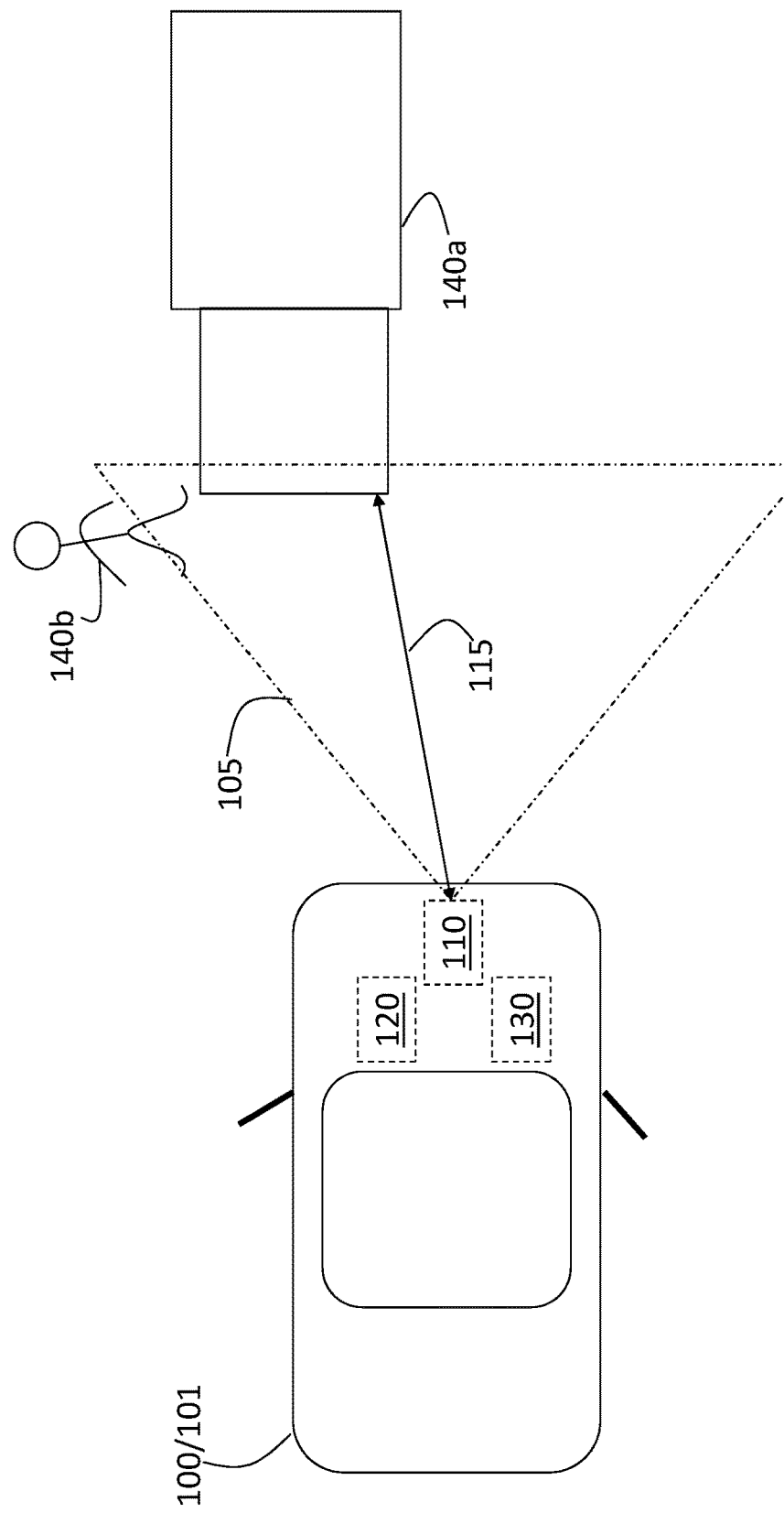
FIG. 1 is a block diagram of a vehicle with a radar system that facilitates separation of close targets based on Doppler precoding.

The following description is merely exemplary in nature and is not intended to limit the present disclosure, its application or uses. It should be understood that throughout the drawings, corresponding reference numerals indicate like or corresponding parts and features.

As previously noted, a target with reflectivity that is relatively higher as compared with another target (e.g., a truck as compared with a pedestrian) may mask the lower reflectivity target based on the filter bandwidth that captures their Doppler frequencies being limited. Embodiments of the systems and methods detailed herein relate to the separation of close targets based on Doppler precoding. Specifically, after a target is detected, the pulses transmitted subsequently are designed to cancel or create a null for the detected target such that any lower reflectivity target can be detected rather than being masked. While vehicle radar systems are specifically discussed for explanatory purposes, the embodiments discussed herein are applicable in any scenario in which relative movement of the targets and radar system platform leads to limited filter bandwidth.

In accordance with an exemplary embodiment, FIG. 1 is a block diagram of a vehicle 100 with a radar system 110 that facilitates separation of close targets based on Doppler precoding. The exemplary vehicle 100 shown in FIG. 1 is an automobile 101. The vehicle 100 includes a radar system 110 that transmits and receives pulses 115 within a field of view 105. The radar system 110 may include multiple transmit elements that transmit pulses 115 and multiple receive elements that receive reflected pulses 115 based on each of the transmissions according to a multi-input multi-output (MIMO) configuration. Two exemplary targets 140a, 140b (generally referred to as 140) are shown. The truck is a target 140a that is relatively highly reflective as compared to the pedestrian who is relatively a lower reflective target 140b. In the exemplary case, the targets 140 may be moving at approximately the same speed in the same direction.

The vehicle 100 also includes a controller 120 that may be part of or coupled to the radar system 110. The controller 120 comprises processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. After the target 140a is detected, the controller 120 determines a transmit pulse sequence (e.g., transmit pulse sequence 220 (FIG. 2)) for the radar system 110 to cancel the reflections from the high reflectivity target 140a, as discussed with reference to FIG. 3. Vehicle systems 130 (e.g., collision avoidance, adaptive cruise control, autonomous driving) obtain information about targets 140 detected by the radar system 110 in order to perform actions to augment or automate driving.

Figure 2:
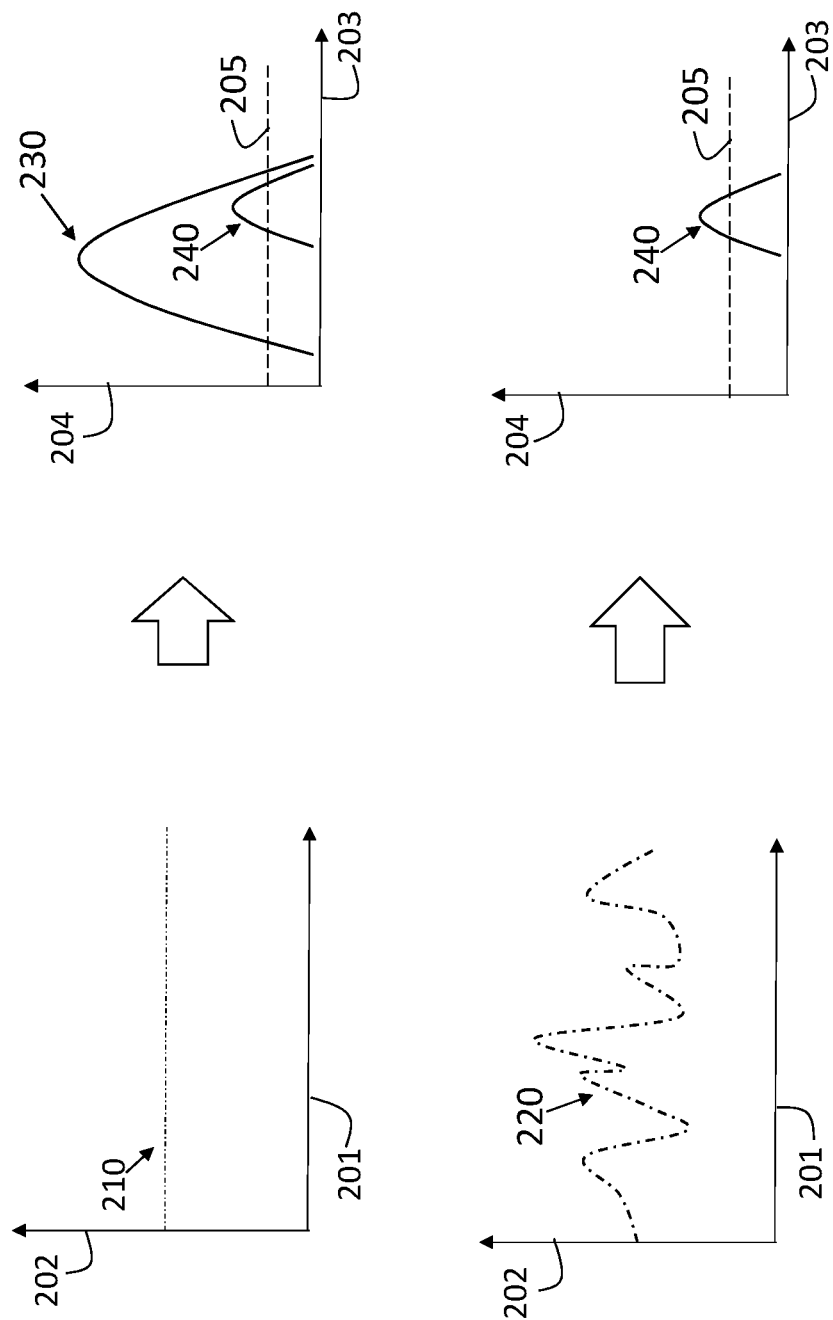
FIG. 2 shows two transmit pulse sequences that are generated according to one or more embodiments.

FIG. 2 shows two transmit pulse sequences 210, 220 that are generated according to one or more embodiments. The pulse sequences 210, 220 are shown with a sampling index along axis 201 and phase along axis 202. That is, the pulse sequences 210, 220 shown in FIG. 2 result from sampling a waveform at a defined rate. The results of transmitting the pulse sequences 210, 220, in the scenario shown in FIG. 1, are indicated in FIG. 2. Pulse sequence 210 is a default pulse sequence, and the pulse sequence 220 is a nulling pulse sequence. Specifically, receiving and processing the reflected pulses 115 resulting from transmitting the pulse sequence 210 is frequency response 230 corresponding with target 140a, the higher reflectivity target, and frequency response 240 corresponding with target 140b, the lower reflectivity target. Frequency is along axis 203, and amplitude is along axis 204.

As FIG. 2 shows, the amplitude of the frequency response 230 corresponding with target 140a is more than double the amplitude of the frequency response 240 corresponding with target 140b. As a result, even if both targets 140 result in frequency responses 230, 240 above a detection threshold 205, the target 140b is masked by the presence of the target 140a. According to one or more embodiments, the pulse sequence 220 is designed to null the frequency response 230. Thus, as indicated in FIG. 2, the frequency response 240, but not the frequency response 230, results from processing the reflected pulses 115 that result from the pulse sequence 220. As a consequence, the target 140b, which corresponds with the frequency response 230, can be detected based on transmitting the pulse sequence 220.

Figure 3:
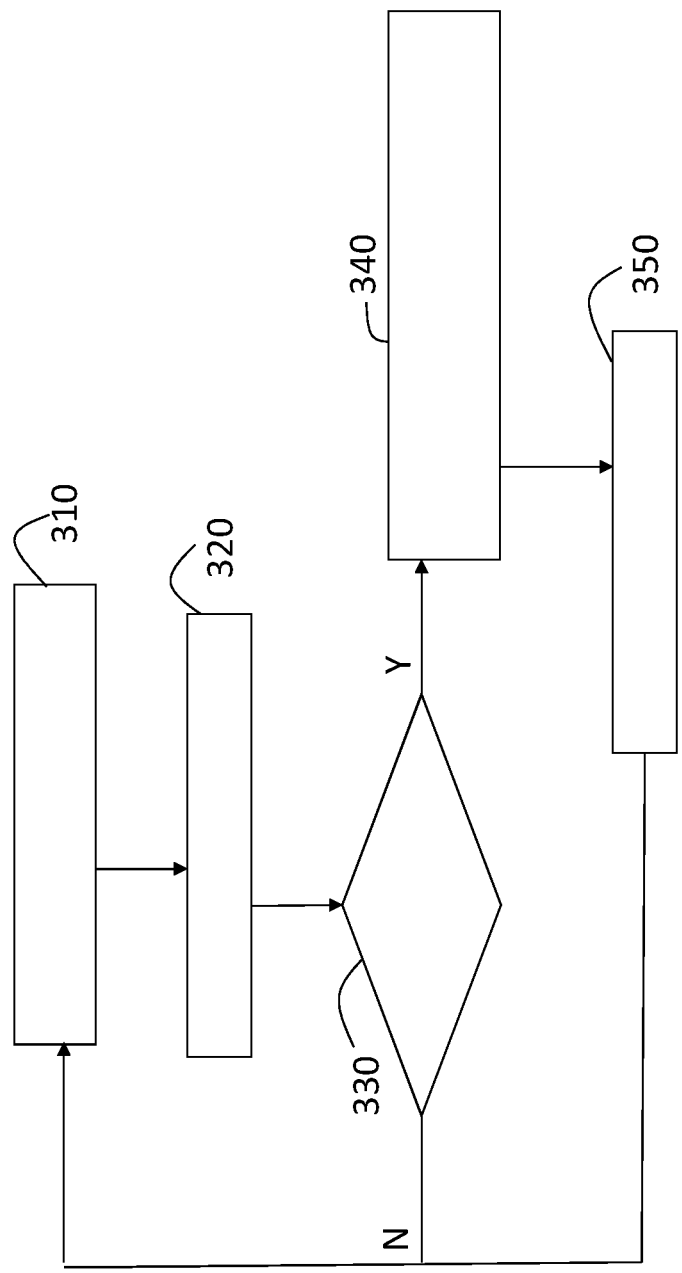
FIG. 3 is a process flow of a method of providing separation of close targets based on Doppler precoding according to one or more embodiments.

FIG. 3 is a process flow of a method of providing separation of close targets based on Doppler precoding according to one or more embodiments. At block 310, transmitting a pulse sequence refers to transmitting a default pulse sequence. The pulse sequence 210 transmitted at block 310 may have a constant phase, as shown in FIG. 2, for example. The pulse sequence 210 may also be coded. Processing reflected pulses 115, at block 320, includes obtaining a matrix A of all received sequences for Doppler frequencies $f_0, f_1, \ldots, f_L$:

$$A = [a(f_0) a(f_1) \ldots a(f_L)] \quad [\text{EQ. 1}]$$

Each column of the matrix A relates to a set of received samples for a given frequency $a(f_i)$ at sampling time intervals $T_0, T_1, \ldots, T_L$:

$$a(f_i) = [e^{j2\pi f_i T_0} e^{j2\pi f_i T_1} \ldots e^{j2\pi f_i T_L}]^T \quad [\text{EQ. 2}]$$

A target is detected based on which, if any, of the columns of matrix A have values that exceed a detection threshold. The T in EQ. 2 indicates a transpose such that each set of received samples $a(f_i)$ is a column vector.

At block 330, a check is made of whether a target is detected based on the transmission of the pulse sequence 210 at block 310. If a target is not detected, another iteration of transmitting a pulse sequence 210 is begun at block 310. If a target is detected based on the transmission of a pulse sequence 210 at block 310, then the processes include generating and transmitting a nulling pulse sequence 220, at block 340. This nulling pulse sequence 220 represents Doppler precoding to null the received sequences resulting from the detected target. Transmitting the nulling pulse sequence 220 results in nulling the received samples associated with the detected target. Generating the nulling pulse sequence 220 is based on a binary vector b of the same length, L+1, as the number of columns in matrix A. An exemplary vector b is given by:

$$b = [1\ 1\ 0\ 1\ 1\ \ldots]^T \quad [\text{EQ. 3}]$$

In vector b, every element is 1 except the element corresponding with the frequency at which the target was detected, which is 0. For example, if a target was detected at $f_2$, based on the processing at block 320, then the binary vector b shown in EQ. 3 would be selected. The nulling pulse sequence 220 w is given by:

$$w = \arg\min_{\tilde{w}} \|A\tilde{w} - b\|^2 \quad [\text{EQ. 4}]$$

The nulling pulse sequence 220 w may be solved analytically as:

$$w = (A^H A)^{-1} A^H b \quad [\text{EQ. 5}]$$

The H in EQ. 5 indicates a Hermitian transpose. Processing reflected pulses 115 resulting from the nulling pulse sequence 220, at block, 350, is done in the same way as processing reflected pulses 115 at block 320. Whether or not a previously masked target is found based on the processing at block 350, processing returns to block 310 with the transmission of a default pulse sequence 210.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of separating close targets, the method comprising:
   transmitting a pulse sequence;
   detecting a first target at a first target Doppler frequency based on processed received reflections resulting from the pulse sequence; and
   transmitting a nulling pulse sequence designed to null the processed received reflections at the target Doppler frequency.

2. The method according to claim 1, further comprising detecting a second target having a lower reflectivity than the target based on the processed received reflections resulting from the nulling pulse sequence.

3. The method according to claim 1, further comprising generating the pulse sequence to have a constant phase.

4. The method according to claim 1, wherein the detecting the first target includes forming a matrix of received sequences $a(f_i)$ for Doppler frequencies $f_i$ of $f_0$ through $f_L$ given by:

$$A = [a(f_0) a(f_1) \ldots a(f_L)].$$

5. The method according to claim 4, wherein the detecting the first target includes determining each of the received sequences $a(f_i)$ for sampling time intervals $T_0$ through $T_L$ as:

$$a(f_i) = [e^{j2\pi f_i T_0}\ e^{j2\pi f_i T_1} \ldots e^{j2\pi f_i T_L}]^T, \text{ where}$$

T indicates a transpose to a column vector.

6. The method according to claim 5, further comprising generating the nulling pulse sequence includes generating a binary vector b of length L+1.

7. The method according to claim 6, wherein the generating the binary vector b includes setting every element of the binary vector b to 1 except the element corresponding with the target Doppler frequency of the first target.

8. The method according to claim 6, wherein the generating the nulling pulse sequence is according to:

$$w = \arg\min_{\tilde{w}} \|A\tilde{w} - b\|^2, \text{ where}$$

w is the null pulse sequence.

9. The method according to claim 8, further comprising solving for the nulling pulse sequence as:

$$w = (A^H A)^{-1} A^H b, \text{ where}$$

H represents a Hermitian transpose.

10. The method according to claim 1, further comprising transmitting the pulse sequence again following the transmitting the nulling pulse sequence.

11. A system to separate close targets, the system comprising:
    a radar system configured to transmit a pulse sequence; and
    a controller configured to detect a first target at a first target Doppler frequency based on processed received reflections resulting from the pulse sequence and to generate a nulling pulse sequence designed to null the processed received reflections at the target Doppler frequency.

12. The system according to claim 11, wherein the controller is further configured to detect a second target having a lower reflectivity than the target based on the processed received reflections resulting from the nulling pulse sequence.

13. The system according to claim 11, wherein the controller is further configured to generate the pulse sequence to have a constant phase.

14. The system according to claim 11, wherein the controller is further configured to detect the first target based on forming a matrix of received sequences $a(f_i)$ for Doppler frequencies $f_i$ of $f_0$ through $f_L$ given by:

$$A = [a(f_0) a(f_1) \ldots a(f_L)].$$

15. The system according to claim 14, wherein the controller is further configured to detect the first target based on determining each of the received sequences $a(f_i)$ for sampling time intervals $T_0$ through $T_L$ as:

$$a(f_i) = [e^{j2\pi f_i T_0}\ e^{j2\pi f_i T_1} \ldots e^{j2\pi f_i T_L}]^T, \text{ where}$$

T indicates a transpose to a column vector.

16. The system according to claim 15, wherein the controller is further configured to generate the nulling pulse sequence based on generating a binary vector b of length L+1.

17. The system according to claim 16, wherein the controller is further configured to generate the binary vector b based on setting every element of the binary vector b to 1 except the element corresponding with the target Doppler frequency of the first target.

18. The system according to claim 16, wherein the controller is further configured to generate the nulling pulse sequence according to:

$$w = \arg\min_{\tilde{w}} \|A\tilde{w} - b\|^2, \text{ where}$$

w is the null pulse sequence.

19. The system according to claim 18, wherein the controller is further configured to solve for the nulling pulse sequence as:

$w = (A^H A)^{-1} A^H b$, where

H represents a Hermitian transpose.

20. The system according to claim 11, wherein the radar system is further configured to transmit the pulse sequence again following transmitting the nulling pulse sequence.

* * * * *